UNITED STATES PATENT OFFICE.

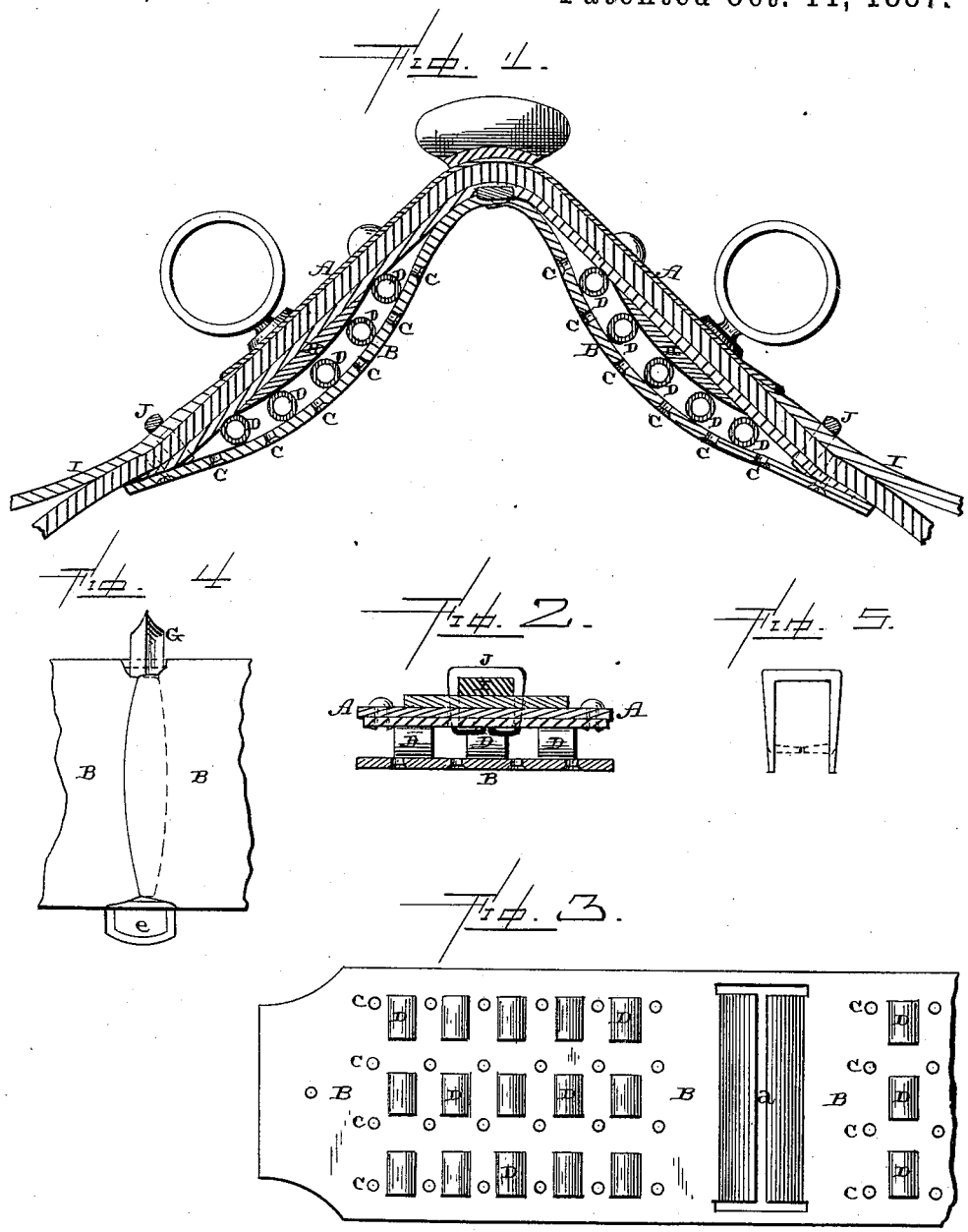

JOHN FISCHER, OF LOUISVILLE, KENTUCKY.

HARNESS SADDLE AND PAD.

SPECIFICATION forming part of Letters Patent No. 371,442, dated October 11, 1887.

Application filed February 19, 1887. Serial No. 228,221. (No model.)

*To all whom it may concern:*

Be it known that I, JOHN FISCHER, of Louisville, in the county of Jefferson and State of Kentucky, have invented certain new and useful Improvements in Harness Saddles and Pads; and I do hereby declare the following to be a full, clear, and exact description of the invention, such as will enable others skilled in the art to which it pertains to make and use it, reference being had to the accompanying drawings, which form part of this specification.

My invention relates to an improvement in harness saddles and pads; and it consists in, first, the combination of the saddle with a pad, which is formed of a suitable piece of leather or other material, and which is provided with a series of parallel rows of holes which extend across it, with ribs which are placed parallel to each other and in between the rows of holes, the rows in between the ribs being open at each end, so as to allow the air to pass freely through the openings in the pad, and second, the arrangement and combination of parts, which will be more fully described hereinafter, and set forth in the claims.

The objects of my invention are to provide a pad for saddles and harnesses which will prevent the back of the animal from becoming galled, and which is perforated, so as to allow the air to pass freely through while the animal is in motion, and with means for preventing these perforations from becoming closed; to attach the supporting-strap to the saddle by means of a metallic staple, the ends of which can be readily clinched; to so shape the pad at its center that it will conform to the shape of the saddle and to be readily attached thereto, and to entirely do away with the usual padding or lining which has heretofore been used in connection with saddles of all kinds.

Figure 1 is a vertical section taken through a pad embodying my invention. Fig. 2 is a vertical section taken at right angles to Fig. 1. Fig. 3 is a view of the central portion of the pad, showing the opening which is formed through it. Fig. 4 is a detail view of the pad. Fig. 5 is a detail view of the staple.

A represents an ordinary harness saddle, and B the pad, which is applied thereto. This pad is made from a piece of leather or other suitable material, and is provided with a series of rows or perforations, C, which extend parallel across the width of the pad, and which perforations are made widest at their bottoms and narrowest at their tops. This pad is to be placed next to the horse's skin, and takes the place of the usual lining or padding which is applied to the saddles. The apertures are for the purpose of allowing air to pass freely through them at all times while the horse is in motion, and they are made conical in form, so as to prevent them from becoming readily clogged by means of the dust and sweat which rise from the horse's skin. Fastened in any suitable manner across the top of this perforated pad are a series of ribs, D, which are placed between the rows of openings, as shown. These ribs are preferably formed from short pieces of rubber or other similar elastic material, which are fastened in between the rows of apertures in any suitable manner. These ribs serve to prevent the flap of the saddle from closing down upon the pad, and thus closing up the apertures through which the circulation of air takes place. These ribs are placed in between the parallel rows of apertures, so as to leave the rows open at each end, and thus allow the air to freely circulate while the horse is in motion. The ribs are here shown as being made of short pieces of rubber tubing, the ends of which are separated a slight distance from each other; but the ribs may be formed of one continuous piece, and extend entirely across, if so preferred. These ribs, being made of rubber or other elastic material, allow the pad to give, and thus prevent it from injuring the horse's back in any manner.

Before the pad is applied to the saddle a suitable opening, *a*, is formed through its center, and then the edges upon each side of this opening are skived down, so as to be as thin as possible, and then when this pad is applied to the saddle the edges overlap each other, as shown. The hook G is passed through one end of the opening, and the staple *e*, to which the back-strap of the harness is fastened, is passed through the other end, and thus the pad is secured in position to the center of the saddle without the aid of any special fastening device or means of any kind. The lower ends of the pads are fastened in position by means of screws or other similar devices, which pass through the lower end of the flap, as shown. Owing to the conical shape of the apertures C, any dust or dirt which may work through them may be readily shaken out, and the spaces between the ribs may be freed from any dust which may settle therein. The ends of the spaces between the ribs being always open, the currents of air sweep freely through them, and thus the horse's back, where the pad is resting upon it, is prevented from becoming heated and galled.

When the saddle is purchased, if the pad does not conform to the shape of the horse's back a separate piece of leather, H, of suitable form, may be placed between the ribs upon the pad and the under side of the flap, and thus give the desired rounding shape. This piece H will be made thickest at its center and thinnest at its upper and lower edges, as shown.

In order to fasten the bearing-strap I to the flap of the saddle, a metallic staple, J, is used, and which is made of some malleable material, so that its ends can be bent or clinched against the under side of the flap. These ends are reduced in thickness, so that they can be bent in any desired direction. The central portion of this staple is made rounding where it bears upon the top of the strap, so as not to cut or injure it in any manner. This staple forms a very cheap and convenient mode of fastening this strap in position upon the saddle.

Having thus described my invention, I claim—

1. A pad formed of a piece of leather or other suitable material, having the conical-shaped perforations through it, and the ribs placed across its top in between the rows of perforations, so as to separate the pad from the saddle, substantially as shown.

2. The combination of the saddle with the pad provided with rows of openings through it, and the ribs which are secured upon the top of the pad in between the rows of openings, the ends of the spaces between the ribs being opened, so as to allow a free circulation of air, substantially as described.

3. The combination of the saddle, the perforated pad, and the ribs placed between the two and made of rubber or some elastic material, substantially as set forth.

4. The pad having an opening made through its center and having its edges skived on opposite sides of the opening, whereby it can be adjusted to the shape of the saddle and fastened thereto, substantially as specified.

5. The combination of the saddle, the pad, and the pieces which are placed between the pad and the saddle, so as to cause the saddle to conform to the shape of the horse's back, substantially as described.

In testimony whereof I affix my signature in presence of two witnesses.

JOHN FISCHER.

Witnesses:
JOHN HAUTH,
NICKLAS WEIGEL.